United States Patent
Bi et al.

(10) Patent No.: US 9,791,549 B2
(45) Date of Patent: Oct. 17, 2017

(54) RADAR SENSOR AND METHOD FOR OPERATING A RADAR SENSOR

(71) Applicant: Robert Bosch GmbH, Stuttgart, DE (US)

(72) Inventors: Jingying Bi, Leonberg (DE); Goetz Kuehnle, Hemmingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 525 days.

(21) Appl. No.: 14/318,252

(22) Filed: Jun. 27, 2014

(65) Prior Publication Data

US 2015/0002332 A1    Jan. 1, 2015

(30) Foreign Application Priority Data

Jun. 28, 2013   (DE) .................. 10 2013 212 664

(51) Int. Cl.
| | | |
|---|---|---|
| G01S 7/35 | (2006.01) | |
| G01S 13/34 | (2006.01) | |
| G01S 13/93 | (2006.01) | |
| G01S 13/02 | (2006.01) | |

(52) U.S. Cl.
CPC .............. *G01S 7/35* (2013.01); *G01S 13/02* (2013.01); *G01S 13/34* (2013.01); *G01S 13/343* (2013.01); *G01S 13/345* (2013.01); *G01S 13/931* (2013.01)

(58) Field of Classification Search
CPC . G01S 13/02; G01S 7/35; G01S 13/34; G01S 13/343
USPC ........................................ 342/385
See application file for complete search history.

(56) References Cited

U.S. PATENT DOCUMENTS

| | | | |
|---|---|---|---|
| 4,302,758 A | | 11/1981 | Tomasi |
| 4,861,419 A | * | 8/1989 | Flinchbaugh ..... H01J 37/32935 156/345.24 |
| 6,366,236 B1 | * | 4/2002 | Farmer ................... G01S 7/417 342/118 |
| 9,389,306 B2 | * | 7/2016 | Nogueira-Nine ....... G01S 7/412 |
| 2005/0285773 A1 | * | 12/2005 | Hartzstein ............... G01S 7/032 342/70 |
| 2008/0024353 A1 | * | 1/2008 | Schneider ............. G01S 13/931 342/70 |
| 2012/0092209 A1 | * | 4/2012 | Nakagawa ............ G01S 13/584 342/109 |

FOREIGN PATENT DOCUMENTS

| | | |
|---|---|---|
| DE | 10 2006 020 943 | 11/2007 |
| DE | 10 2009 057 191 | 6/2011 |
| JP | 2004-151022 | 5/2004 |

\* cited by examiner

*Primary Examiner* — Timothy A Brainard
*Assistant Examiner* — Woodner T Risselin
(74) *Attorney, Agent, or Firm* — Norton Rose Fulbright US LLP; Gerard Messina

(57) ABSTRACT

In a method for operating a radar sensor, the unambiguousness range of the radar sensor is increased with respect to the range and/or the relative velocity by: transmitting multiple ramp sets by the radar sensor, the frequency ramps of the individual ramp sets each differing in one system parameter; adapting the sampling frequency during the detection of the radar echoes in such a way that a constant number of samples always results for each frequency ramp; and, to evaluate the radar signals, the spectra are periodically continued and compared to each other.

18 Claims, 3 Drawing Sheets

RADAR SENSOR AND METHOD FOR OPERATING A RADAR SENSOR

BACKGROUND OF THE INVENTION

1. Field of the Invention

The present invention relates to a radar sensor and a method for operating a radar sensor, e.g., a radar sensor having rapid-chirp radar signals.

2. Description of the Related Art

Modern motor vehicles increasingly have driver assistance systems for supporting a vehicle driver when driving the motor vehicle. For example, such driver assistance systems may inform the vehicle driver about an obstacle while parking. In addition, driver assistance systems may also support the vehicle driver during travel by, for example, detecting an obstacle on the travel route of the motor vehicle and then signaling this potential hazard to the vehicle driver, or possibly even actively intervening into the driving behavior of the motor vehicle.

LFMCW (linear frequency modulated continuous wave) modulation of the radar signals has been used very frequently in the automotive field up to now, due to the low hardware complexity and the low computing complexity. However, with this method, when ascertaining range X and relative velocity v of an object, all targets on a straight line in the X-v space are mapped to a single frequency. This ambiguity may be partially resolved by resolving the spatial points of multiple LFMCW ramps having different ramp slopes in combination with a matching method. One method for determining the range and/or the relative velocity with the aid of an LFMCW radar device is, for example, disclosed in the published German patent application document DE 10 2009 057 191 A1.

Rapid-chirp sequence modulation, for example, provides an alternative to LFMCW modulation. In this modulation type, very short frequency ramps are transmitted in succession. The duration of a frequency ramp is typically in the range from approximately 10 µs up to a few 10 µs. The distance between the individual frequency ramps is only a few microseconds. This rapid-chirp sequence modulation allows a good separation of the targets based solely on different ranges X and relative velocities v due to very short frequency ramps. The range estimation is carried out independently of the relative velocity estimation. Therefore, unlike LFMCW modulation, with rapid-chirp sequence modulation, no ambiguities exist due to overlaps of the range and the relative velocity. For further digital processing, it is necessary to convert the radar signals and the radar echoes received by the radar system into digital signals. For a large unambiguousness range with respect to the range, a high sampling rate is required for the digitization of the radar signals and the received radar echoes. Due to the predefined very short ramp period of the transmitted frequency ramps, the high sampling rate is possible only using a large number of samples. In addition, the unambiguousness and the separability for the detection of objects in radial velocity are a function of the number of frequency ramps and the time difference between consecutive frequency ramps. In short, the system requirements with respect to the unambiguousness and the separability are limited by the requirements on the hardware, for example, the sampling rate, memory capacity, data transmission rate, and computing complexity. In the automotive field, the focus is particularly on low hardware costs and short signal processing times. Therefore, there is a need for an efficient rapid-chirp radar system having both a large unambiguousness range and good separability.

BRIEF SUMMARY OF THE INVENTION

According to one aspect, the present invention provides a radar sensor including a transceiver unit which is designed to transmit a sequence of modulated rapid-chirp radar signals and to receive the radar echoes of the transmitted rapid-chirp radar signals which are reflected by objects; and a sampling device which is designed to sample the received radar echoes at a sampling frequency; the transmitted rapid-chirp radar signals including a plurality of ramp sets; each ramp set having a plurality of frequency ramps; each frequency ramp of a ramp set having a ramp period and a frequency deviation; and two frequency ramps having a time difference; two consecutive ramp sets differing at least in the ramp period and/or the time difference between consecutive frequency ramps; and the sampling device (30) varying the sampling frequency for each ramp set.

According to another aspect, the present invention provides a method for operating a radar sensor including the steps of transmitting rapid-chirp radar signals; receiving radar echoes of the transmitted rapid-chirp radar signals which are reflected by objects; and detecting the received radar echoes at a predefined sampling frequency; the transmitted rapid-chirp radar signals including a plurality of ramp sets; each ramp set having a plurality of frequency ramps; each frequency ramp of a ramp set having a ramp period and a frequency deviation; and two consecutive frequency ramps having a time difference; and two ramp sets differing at least in the ramp period and/or the time difference between consecutive frequency ramps; and the predefined sampling frequency being varied for each ramp set.

One idea of the present invention is to operate a radar sensor based on modulated rapid-chirp radar signals having multiple sequences of frequency ramps, the individual sequences of the frequency ramps differing in one characteristic parameter such as the ramp period or the time interval between two consecutive frequency ramps. The radar sensor is able to carry out a separate estimation of range and relative velocity for each of these ramp sets having individual characteristic parameters. Furthermore, one idea of the present invention is to adjust the sampling frequency for detecting the radar signals as a function of the parameter variation.

One essential advantage of the present invention is that the separability and unambiguousness of the radar system may be improved by the combined evaluation of the detection results of the range and/or the relative velocity for each of the ramp sets.

In addition, the improvement and increase of the separability and unambiguousness by the method according to the present invention advantageously results in system requirements for fine separability and high unambiguousness being fulfilled even at relatively low sampling rates for the digitization of the radar signals and the radar echoes during the further processing and/or with a relatively low number of ramps in the radar signals. This possibility of reducing the sampling rates during the digitization and/or the number of ramps makes possible the design of economical, very fast radar systems, which is particularly advantageous in particular in the motor vehicle field.

One additional advantage is that by adjusting the sampling frequency, a number of sampling values is always provided, which makes possible an efficient further processing of the sampled signals.

According to one specific embodiment, the sampling frequency is adjusted as a function of the ramp period. This makes it possible to control the number of detected samples and thus increase the efficiency of the further processing.

In one particular specific embodiment, the radar echo of each transmitted frequency ramp is detected using a constant number of samples. A particularly efficient further processing may be achieved in the radar sensor using a number of samples which is always constant.

In another specific embodiment, the radar sensor has an unambiguousness range which is extended up to the least common multiple of all unambiguousness ranges of the individual ramp sets.

According to one specific embodiment, the transmitted rapid-chirp radar signals include a plurality of ramp sets which are transmitted in succession.

In one alternative specific embodiment, the transmitted rapid-chirp radar signals include a plurality of interleaved ramp sets. For such interleaved ramp sets, the first frequency ramps of each ramp set are initially transmitted in succession, then the second frequency ramps of each ramp set, etc. Since frequency ramps of the different ramp sets are very close together for such an interleaving of the individual ramp sets, an improved detection behavior thus results in particular for moving objects having a high relative velocity with respect to the radar sensor.

According to yet another specific embodiment of the present invention, the differences of the ramp periods and/or the time differences between two consecutive frequency ramps in which the individual ramp sets differ are dynamically adapted. In this way, the radar system is able to adapt very well to each of the instantaneous general conditions. Thus, for example, in particular in the case of a stationary vehicle or a vehicle which is moving very slowly, a different configuration may be set than the one which would be required for a fast-moving vehicle. In this way, for example, during a parking procedure, the radar system may be operated having a smaller unambiguousness range, and during rapid travel, the unambiguousness range may be extended.

According to another specific embodiment, the sequence of the modulated rapid-chirp radar signals has a ramp period of less than 25 µs, preferably not more than 10 µs. Such very rapid modulated rapid-chirp radar signals are highly suitable for a separation of the range estimation and the estimation of the relative velocity, in particular for driver assistance systems of motor vehicles.

The present invention furthermore includes a driver assistance system in a radar sensor according to the present invention.

Furthermore, the present invention includes a motor vehicle having a driver assistance system which has a radar sensor according to the present invention.

According to another specific embodiment, the method according to the present invention includes the steps of calculating a separate spectrum of the detected radar echoes for each of the plurality of ramp sets; creating the periodic continuation of the calculated spectra in the dimension of the range and/or the velocity; and ascertaining a match of a detected object in the periodic continuations of the calculated spectra.

In one particular specific embodiment, the step for creating the periodic continuations extends the calculated spectra up to the least common multiple of the unambiguousness ranges of the ramp sets.

According to another specific embodiment, the step for ascertaining a match forms a cost function and determines a minimum of the cost function. This allows an efficient and robust range estimation.

DETAILED DESCRIPTION OF THE INVENTION

Figure 1:
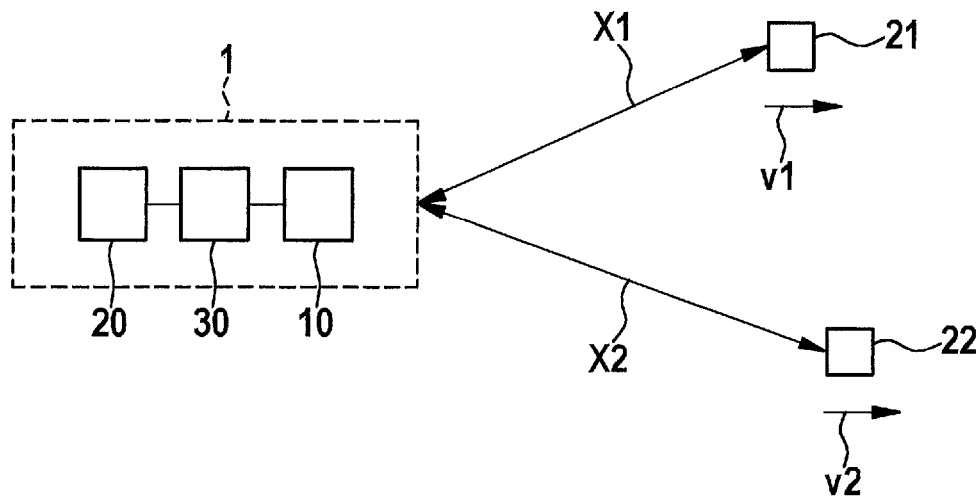
FIG. 1 shows a schematic representation of a radar system according to one specific embodiment of the present invention.

FIG. 1 shows a radar system 1 according to one exemplary embodiment of the present invention. For example, radar sensor 1 may be a radar sensor of a driver assistance system. Such driver assistance systems are preferably used in modern motor vehicles.

Radar system 1 includes a transceiver unit 10. This transceiver unit 10 transmits a sequence of modulated rapid-chirp radar signals. These transmitted rapid-chirp radar signals strike objects 21 and 22 which are situated at respective distances X1 and X2 from radar sensor 1. Objects 21 and 22 move relative to radar sensor 1 at velocities v1 and v2. In addition, it is also possible that the additional objects are situated in the detection range of radar sensor 1. Distances X1 and X2 and relative velocities v1 and v2 of the individual objects may be different. However, it is also possible that distances X1 and X2 and relative velocities v1 and v2 of some objects are completely or approximately equal.

The modulated rapid-chirp radar signals transmitted by transceiver unit 10 strike objects 21 and 22 after some time. Objects 21 and 22 completely or partially reflect the striking rapid-chirp radar signals. Transceiver unit 10 of radar sensor 1 subsequently receives a portion of the rapid-chirp radar signals reflected by objects 21 and 22. The radar echoes received by transceiver unit 10 are then converted into digital signals in a sampling device 30 and compared to the transmitted rapid-chirp radar signals in an evaluation unit 20. From this comparison, radar sensor 1 then ascertains spatial distances X1 and X2 and relative velocities v1 and v2 of objects 21 and 22 in the detection range of the radar sensor.

Figure 2:
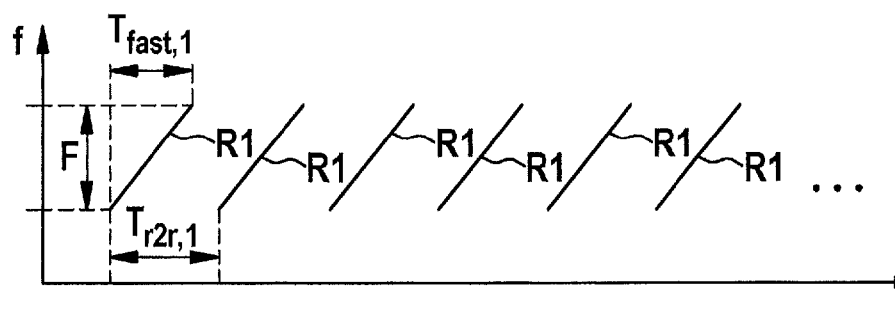
FIG. 2 shows a schematic representation of a ramp set including modulated rapid-chirp radar signals according to one specific embodiment of the present invention.

FIG. 2 shows a schematic representation of a ramp set having a plurality L of frequency ramps R1 in a time-frequency diagram, on which one exemplary embodiment of the present invention is based. One ramp set includes a predefined number L of frequency ramps R1. Each of these frequency ramps R1 has the same frequency deviation F and the same ramp period $T_{fast,1}$. The distance between two consecutive frequency ramps R1 is characterized by parameter $T_{r2r,1}$. Ramp period $T_{fast,1}$ is preferably less than 25 μs for modulated rapid-chirp radar signals. Ramp period $T_{fast,1}$ may, for example, be approximately 10 μs or less. The time interval between the end of a first frequency ramp R1 and the following second frequency ramp R1 is generally only a few microseconds, so that a time interval may result between two consecutive frequency ramps of, for example, approximately 14 μs. A ramp set may include a predefined number L of frequency ramps R1. For example, a ramp set may include 256 frequency ramps R1. However, a number of frequency ramps R1 deviating from this is also possible. The frequency deviation of frequency ramps R1 is generally more than 100 MHz. For example, a frequency deviation F of 250 MHz is possible. To digitize the frequency ramps and the detected radar echoes, the signals must be sampled. For this purpose, for example, the radar system having the aforementioned system parameters may be sampled 512 times per frequency ramp. This sampling rate K limits the maximum performance of the radar system with respect to unambiguousness and separability.

Maximum unambiguousness range $X_{max}$ and resolution $\Delta X$ are functions of sampling rate K as follows:

$$X_{max}=K/2 \cdot \Delta X; f_{x,max}=K/2 \cdot \Delta f_x \quad (1)$$

In addition, maximum resolvable relative velocity $v_{max}$ and resolution of relative velocity $\Delta v$ are functions of the number of frequency ramps L in a ramp set as follows:

$$v_{max}=L/2 \cdot \Delta v; f_{v,max}=L/2 \cdot \Delta f_v. \quad (2)$$

Figure 3:
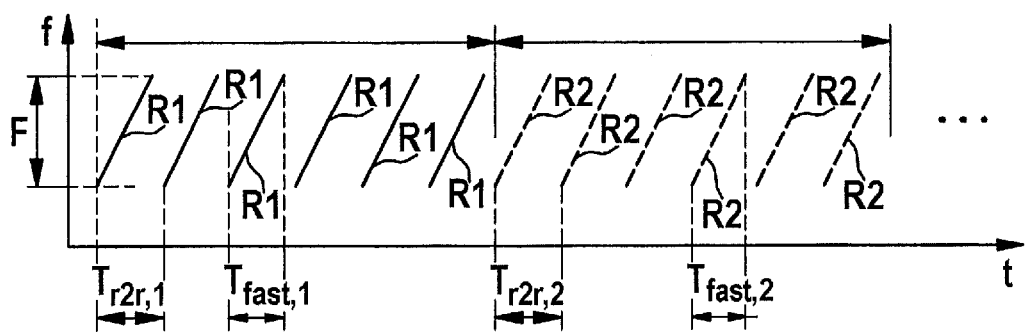
FIG. 3 shows a schematic representation of a sequence of two ramp sets of rapid-chirp radar signals according to another specific embodiment of the present invention.

FIG. 3 shows a schematic representation of a time-frequency diagram with two consecutive ramp sets according to one exemplary embodiment of the present invention. The first ramp set includes a predefined number L of frequency ramps R1. All frequency ramps of the first ramp set have the same frequency deviation F. In addition, all frequency ramps R1 of the first ramp set have a predefined first ramp period $T_{fast,1}$ and a time interval between two frequency ramps of $T_{r2r,1}$. A second ramp set follows this first ramp set, which also includes the same predefined number L of frequency ramps from R1. The second ramp set includes second frequency ramps R2, which preferably have the same frequency deviation F as first frequency ramps R1. In addition, second frequency ramps R2 have a ramp period $T_{fast,2}$ and a time interval between two consecutive second frequency ramps R2 of $T_{r2r,2}$. Even if only two consecutive ramp sets are depicted in the exemplary embodiment shown in FIG. 3, it is also possible to transmit more than two ramp sets in succession, each of the ramp sets having individual system parameters for ramp period $T_{fast,i}$ and for time interval $T_{r2r,i}$ between two fast frequency ramps.

Multiple ramp sets are transmitted for extending the maximum unambiguousness range $f_{X,max}$ with respect to the range of the objects to be monitored, the ramp periods $T_{fast,i}$ of the frequency ramps of the different ramp sets differing. In other words, ramp period $T_{fast,1}$ of frequency ramps R1 of the first ramp set is different from ramp period $T_{fast,2}$ of frequency ramps R2 of the second ramp set. If more than two different ramp sets are transmitted, the subsequent ramp sets also have deviating ramp periods $T_{fast,i}$. Furthermore, for the case that the maximum unambiguousness range of radar sensor 1 is to be extended, time interval $T_{r2r,i}$ between two consecutive fast frequency ramps is equal for all frequency ramps of the different ramp sets. Furthermore, all ramp sets have the same number L of frequency ramps R1, R2.

The resulting actual range in the spatial frequency domain is:

$$f_{RC}=n_i \cdot f_{Xmax,i}+r_i, \quad (3)$$

where $$r_i=q_i \cdot \Delta f_{X,i} \quad (4)$$

$n_i$ and $q_i$ are integers and i is an integer between 1 and P, where P is the number of different frequency ramps. Thus, the unambiguousness range of the radar system for the range may be extended up to the least common multiple (LCM) of the unambiguousness ranges of all individual ramp sets:

$$f_{X,max}=LCM(f_{X,max,1},f_{X,max,2}, \ldots f_{X,max,P}) \quad (5)$$

When selecting the modulation parameters, it must therefore in particular be ensured that the resulting unambiguousness ranges of the individual ramp sets are not a multiple of each other.

Alternatively, to increase the unambiguousness range with respect to the relative velocity of the objects to be monitored, time interval $T_{r2r,i}$ between two fast frequency ramps in the individual ramp sets may be varied. The remaining system parameters, such as frequency deviation F, ramp period $T_{fast,i}$, and number L of the frequency ramps per ramp set remain the same for all ramp sets. Analogously to the increase of the unambiguousness in the range direction, the unambiguousness of relative velocity $v_{max}$ may thus also be increased correspondingly:

$$f_{v,max}=LCM(f_{v,max,1},f_{v,max,2}, \ldots f_{v,max,P}) \quad (6)$$

The system parameters of the frequency ramps and the ramp sets may be dynamically adapted according to instantaneous general conditions. For example, the system parameters in a radar system of a driver assistance system of a motor vehicle may be adapted in such a way that the unambiguousness range is relatively small during slow travel or a parking procedure. In contrast, if the velocity increases, the system parameters such as ramp period $T_{fast,i}$ and/or the time interval $T_{r2r,i}$ of the frequency ramps may be adapted per ramp set in order to increase the unambiguousness range. Depending on the use case, other dynamic adaptations are also possible.

For the analog-digital conversion of the rapid-chirp radar signals and the received radar echoes, each of the signals must be digitized at a suitable sampling rate. The sampling rate of each of the frequency ramps must satisfy the Shannon sampling theorem and must therefore be sampled at least at twice the frequency of the frequency ramp.

Furthermore, for the additional signal processing and in particular for the search method described below, it is advantageous if each frequency ramp has the same number of samples. In particular, it is advantageous to generate a number of samples for all sampled frequency ramps which is able to be further processed particularly efficiently using a fast Fourier transform (FFT).

This means that an individual sampling frequency results for each ramp set. The individual sampling rates and thus also the system parameters for the frequency ramps of the individual ramp sets must be chosen in such a way that the extended maximum unambiguousness and the measuring accuracy meet the system requirements.

Figure 4:
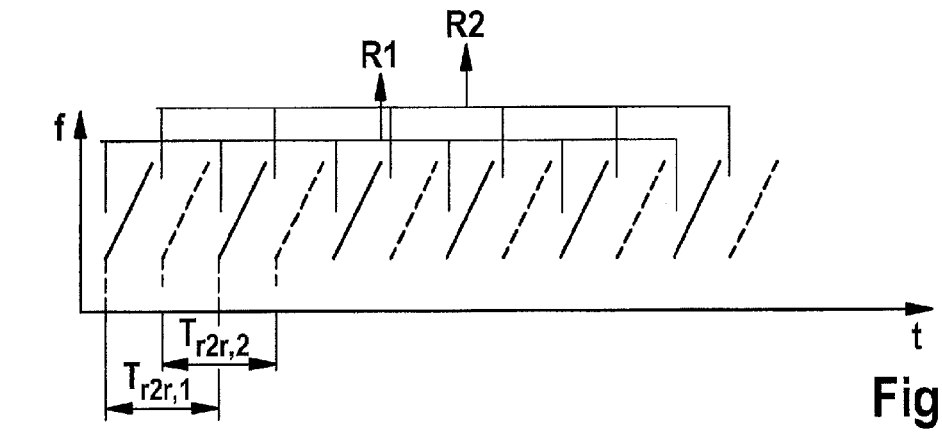
FIG. 4 shows a schematic representation of interleaved rapid-chirp radar signals according to yet another specific embodiment of the present invention.

FIG. 4 shows a schematic representation of a time-frequency diagram for an interleaving of multiple ramp sets according to another exemplary embodiment of the present invention. As is apparent in this diagram, a first frequency ramp R1 of a first ramp set, and then the frequency ramp R2 of a second ramp set, are initially transmitted in succession. Should additional ramp sets also be used, in this case (not shown here), each of the first frequency ramps of each of the ramp sets are also initially transmitted in succession. After the first frequency ramp of the last ramp set has been transmitted, second frequency ramp R1 of the first ramp set is subsequently transmitted, then the second frequency ramp of the second ramp set, etc. By interleaving the individual ramp sets, it may be achieved that the individual ramp sets are less susceptible to changes in the objects to be detected. By interleaving the ramp sets, frequency ramps of all ramp sets strike the objects almost simultaneously and are reflected by them. Therefore, such a system is less susceptible when monitoring objects having a high relative velocity. When monitoring objects having a high relative velocity, the risk exists, for example, that the spatial distance between the radar system and the object has changed between the transmission of the first ramp set and the transmission of the following second ramp set, and no matching or only erroneous matching would thus be possible. This problem may be counteracted by the interleaving of the ramp sets according to the present invention.

After the analog-to-digital conversion of the signals, additional signal processing is carried out which includes a two-stage fast Fourier transform (FFT) for each ramp set. This signal processing provides a two-dimensional spectrum of the frequency range $f_x$ with respect to the range estimation over the frequency range $f_D$ with respect to the relative velocity estimation. Ambiguities in this obtained frequency spectrum may subsequently be resolved with the aid of a suitable search method.

Figure 5:
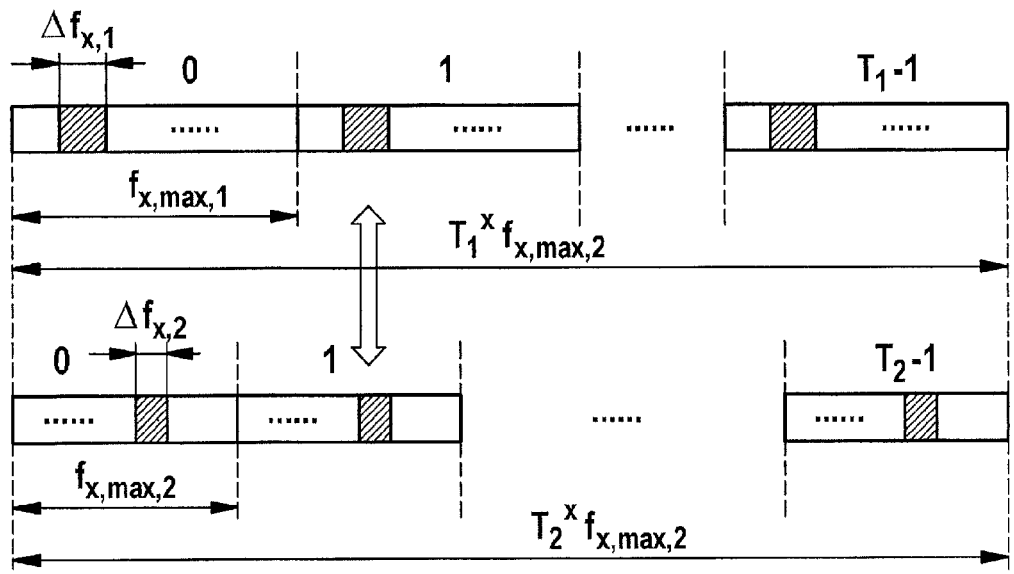
FIG. 5 shows a schematic representation for explaining the search method forming the basis for one specific embodiment of the present invention.

FIG. 5 shows a schematic representation for resolving ambiguities in range directions for a resolution cell $\Delta v$ in the direction of the relative velocity. For this purpose, the spectrum $f_{X,max,i}$ in the dimension of the range is initially continued periodically for each detected peak. The calculated spectrum $f_{X,max,i}$ in the dimension of the range may be repeated until the maximum range $f_{X,max,i}$ to be resolved is achieved according to Formula 5. This periodic repetition of spectrum $f_{X,max,i}$ is carried out for all processed ramp sets.

In the exemplary embodiment shown in FIG. 5, for example, two ramp sets are contrasted. $f_{X,max,1}$ denotes the expansion of the spectrum of the first ramp set in the dimension of the range. $\Delta f_{X,i}$ is the magnitude of a resolution cell of the spectrum of the first ramp set in the dimension of the range. $f_{X,max,2}$ denotes the expansion of the spectrum of the second ramp set in the dimension of the range. $\Delta f_{X,2}$ is the magnitude of a resolution cell of the spectrum of the second ramp set in the dimension of the range.

In the example depicted here, the spectrum of the first ramp set is repeated $T_1$ times, and the spectrum of the second ramp is repeated $T_2$ times. Thus, the spectrum of the first ramp set is extended to $T_1 \cdot f_{X,max,1}$ and the spectrum of the second ramp set is extended to $T_2 \cdot f_{X,max,2}$. Additional exemplary embodiments having more than two ramp sets are also possible.

The periodic repetitions of the individual spectra are then compared to each other and checked for matches of the peaks. In the illustrated example according to FIG. 5, for example, the peaks match best in the second repetition of the first spectrum and the second repetition of the second spectrum, from which the actual range is determined.

To resolve the ambiguities and to determine estimated values $n_{i,est}$ of factor $n_i$ according to Formula 3, a so-called cost function C is established and minimized, as described by Formula 7 for two different ramp sets. The determination of the best match is carried out via a search method which minimizes this cost function C.

$$\min C(n_{1,est}, n_{2,est}) = \{|n_{1,est}f_{X,max,1} + r_{1,est} - n_{2,est}f_{X,max,1} - r_{2,est}|\} \rightarrow (n_1, n_2) \quad (7)$$

Such a search method for minimizing cost function C may, for example, try all variations of $n_1$ and $n_2$ and ascertain those values of $n_1$ and $n_2$ as an answer in which the cost function becomes minimal. $T_1 \cdot T_2$ separate cost functions must be calculated.

After the repetition $n_i$ with which the periodic continuation yields the best match has been ascertained for each ramp set 1–P, the final answer may, for example, be calculated using averaging.

The search complexity may be further reduced using a suitable optimized search method. Such an improved search method carries out, for example, the following steps for minimizing cost function C.

For all values 0 to $T_1-1$ of first estimated value $n_{1,est}$, function $n_{2,est}(n_{1,est})$ is formed and minimized: min $C(n_{1,est}, n_{2,est}(n_{1,est}))$. In addition, for all values 0 to $T_2-1$ of second estimated value $n_{2,est}$, function $n_{1,est}(n_{2,est})$ is formed and minimized: min $C(n_{1,est}(n_{2,est}), n_{2,est})$. Finally, the minimum of both functions is searched for:

$$\min\{\min C(n_{1,est}, n_{2,est}(n_{1,est})), \min C(n_{1,est}(n_{2,est}), n_{2,est})\}. \quad (8)$$

Thus, the resulting complexity is only $T_1 + T_2$ cost functions C to be solved.

In this way, the unambiguousness range of the radar system may be extended at a maximum up to the least common multiple of the unambiguousness ranges of the individual ramp sets. The maximum estimation error in the ascertainment is upwardly limited by the sampling interval of the fast Fourier transform.

The previously described search method with respect to range estimation may also be applied with respect to the estimation of the relative velocity.

In most cases, two ramp sets having a different system parameter are sufficient for the expansion of the maximum unambiguousness into the desired dimension (range or relative velocity). In the case of only two different ramp sets, particularly rapid and resource-saving processing may be achieved. In addition, by using more than two ramp sets, the accuracy may be further improved and/or the unambiguousness range may be additionally extended.

As already previously described, the unambiguousness range with respect to the range may be increased by multiple ramp sets having a variation in the ramp period $T_{fast,i}$. In addition, by varying the time interval $T_{r2r,i}$ between two consecutive fast frequency ramps, the unambiguousness range with respect to the relative velocity may be increased. Thus, by using at least three consecutive ramp sets, the unambiguousness range with respect to the range and the relative velocity may be increased by, for example, the ramp period $T_{fast,i}$ being varied between a first and second ramp set, and the time interval $T_{r2r,i}$ between consecutive fast frequency ramps being varied between the second and third ramp sets. Alternative variations of the system parameters are of course also possible.

Figure 6:
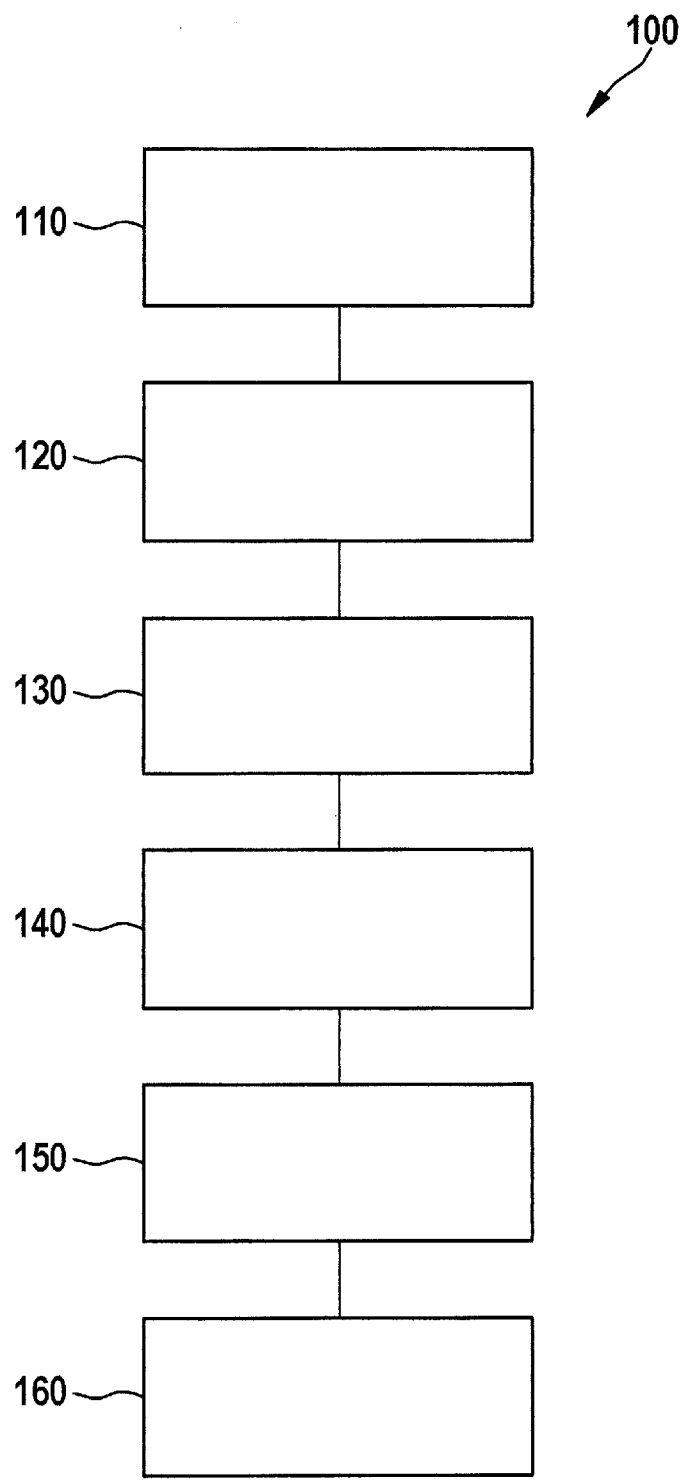
FIG. 6 shows a schematic representation of a method for operating a radar sensor according to yet another specific embodiment of the present invention.

FIG. 6 shows a schematic representation of a method 100 for operating a radar sensor 1 having the following steps: Initially, in a step 110, a sequence of modulated rapid-chirp radar signals is transmitted, and subsequently, in step 120, the radar echoes of the transmitted radar signals which are reflected by the objects are received. The transmitted rapid-chirp radar signals include a plurality of ramp sets. Each ramp set has a plurality of frequency ramps. Furthermore, each frequency ramp in a ramp set has a predefined ramp period $T_{fast,i}$ and a frequency deviation F. In addition, two consecutive frequency ramps have a time difference $T_{r2r,i}$. According to the method according to the present invention, two ramp sets differ at least in the ramp period $T_{fast,i}$ and/or the time difference $T_{r2r,i}$ between consecutive frequency ramps. In step 130, the received radar echoes are then detected using a predefined sampling frequency. The sampling frequency for the individual ramp sets is varied. In particular, the sampling frequency is adapted in such a way that due to the variation of the individual ramp periods, a constant number of samples always results.

Furthermore, in step 140, a separate spectrum $f_{X,max,1}$, $f_{X,max,2}$ of the detected radar echoes may be calculated for each of the plurality of ramp sets. Subsequently, step 150 creates a periodic continuation $T_1 \cdot f_{X,max,1}$ and $T_2 \cdot f_{X,max,2}$ of the calculated spectra $f_{X,max,1}$ and $f_{X,max,2}$ in the dimension of the range and/or the velocity. Then, in step 160, a match of a detected object is ascertained in the periodic continuations $T_1 \cdot f_{X,max,1}$ and $T_2 \cdot f_{X,max,2}$ of the calculated spectra $f_{X,max,1}$ and $f_{X,max,2}$.

In step 150 for creating the periodic continuations $T_1 \cdot f_{X,max,1}$ and $T_2 \cdot f_{X,max,2}$, the calculated spectra $f_{X,max,1}$ and $f_{X,max,2}$ are extended up to the least common multiple of the unambiguousness ranges of the ramp sets.

An efficient ascertainment of the match is possible by forming a previously described cost function.

In summary, the present invention relates to a radar sensor and a method for operating a radar sensor, the unambiguousness range of the radar sensor being increased with respect to the range and/or the relative velocity. For this purpose, multiple ramp sets are transmitted by the radar sensor, the frequency ramps of the individual ramp sets each differing in one system parameter. In particular, the sampling frequency is adapted during the detection of the radar echoes in such a way that a constant number of samples always results for each frequency ramp. To evaluate the radar signals, the spectra may be continued periodically and compared to each other. A reliable determination of the range and the relative velocity is thus possible with a large unambiguousness range, in particular in combination with a suitable search method.

What is claimed is:

1. A radar sensor, comprising:
   a transceiver unit configured to transmit a sequence of modulated rapid-chirp radar signals and to receive radar echoes of the transmitted rapid-chirp radar signals which are reflected by an object; and
   a sampling device configured to sample the received radar echoes at a sampling frequency;
   wherein:
   the transmitted rapid-chirp radar signals include at least two ramp sets;
   each of the at least two ramp sets has a plurality of frequency ramps;
   each frequency ramp of a ramp set has a ramp period and a frequency deviation, and, within each of the at least two ramp sets, all of the frequency ramps of the ramp set have the same ramp period as one another and the same frequency deviation as one another;
   two consecutive frequency ramps have a time difference, and within each of the at least two ramp sets, the time differences between consecutive frequency ramps of the ramp set are the same as one another;
   the transceiver unit transmits the at least two ramp sets, wherein the at least two ramp sets differ from one another in one of the ramp period and the time difference between consecutive frequency ramps, but not both the ramp period and the time difference between consecutive frequency ramps; and
   the sampling device varies the sampling frequency for each ramp set.

2. The radar sensor as recited in claim 1, wherein the sampling frequency is adapted as a function of the ramp period.

3. The radar sensor as recited in claim 2, wherein the radar echo of each transmitted frequency ramp is detected using an equal number of samples.

4. The radar sensor as recited in claim 3, wherein the radar sensor has an unambiguousness range which is extended up to the least common multiple of all unambiguousness ranges of the individual ramp sets.

5. The radar sensor as recited in claim 3, wherein the transmitted rapid-chirp radar signals include a plurality of ramp sets transmitted in succession.

6. The radar sensor as recited in claim 5, wherein the radar sensor is part of a driver assistance system of a motor vehicle.

7. The radar sensor as recited in claim 3, wherein the transmitted rapid-chirp radar signals include a plurality of interleaved ramp sets.

8. The radar sensor as recited in claim 3, wherein the radar sensor is part of a driver assistance system.

9. The radar sensor of claim 1, wherein the differences in ramp period and the time difference between consecutive frequency ramps of the multiple ramp sets are dynamically adapted according to a velocity of a host vehicle of the radar sensor.

10. A method for operating a radar sensor, comprising:
    transmitting a sequence of modulated rapid-chirp radar signals;
    receiving radar echoes of the transmitted modulated rapid-chirp radar signals which are reflected by an object; and
    detecting the received radar echoes at a predefined sampling frequency;
    wherein:
    the transmitted modulated rapid-chirp radar signals include a plurality of ramp sets;
    each of the plurality of ramp sets has a plurality of frequency ramps;
    each frequency ramp of a ramp set has a ramp period and a frequency deviation, and within each of the plurality of ramp sets, all of the frequency ramps of the ramp set have the same ramp period as one another and the same frequency deviation as one another;
    two consecutive frequency ramps have a time difference, and within each of the plurality of ramp sets, the time differences between consecutive frequency ramps of the ramp set are the same as one another;
    the plurality of ramp sets differ from one another in one of the ramp period and the time difference between consecutive frequency ramps, but not both the ramp period and the time difference between consecutive frequency ramps; and
    the predefined sampling frequency is varied for each ramp set.

11. The method as recited in claim 10, further comprising:
    calculating a separate spectrum of the detected radar echoes for each of the plurality of ramp sets;
    creating a periodic continuation of the calculated spectra in the dimension of at least one of the range and the velocity; and ascertaining a match of a detected object in the periodic continuations of the calculated spectra.

12. The method as recited in claim 11, wherein the creating of the periodic continuation includes extending the calculated spectra up to the least common multiple of all unambiguousness ranges of the ramp sets.

13. The method as recited in claim 11, wherein the ascertaining of a match includes forming a cost function and determining a minimum of the cost function for ascertaining the match.

14. The method of claim 10, wherein the differences in ramp period and the time difference between consecutive frequency ramps of the plurality of ramp sets are dynamically adapted according to a velocity of a host vehicle of the radar sensor.

15. A radar sensor for a motor vehicle, comprising:
a transceiver unit configured to transmit a sequence of modulated rapid-chirp radar signals and to receive radar echoes of the transmitted rapid-chirp radar signals which are reflected by an object; and
a sampling device configured to sample the received radar echoes at a sampling frequency;
wherein:
the transmitted rapid-chirp radar signals include multiple ramp sets;
each of the multiple ramp sets has a plurality of frequency ramps;
each frequency ramp of a ramp set has a ramp period and a frequency deviation, and, within each of the multiple ramp sets, all of the frequency ramps of the ramp set have the same ramp period as one another and the same frequency deviation as one another;
two consecutive frequency ramps have a time difference, and within each of the multiple ramp sets, the time differences between consecutive frequency ramps of the ramp set are the same as one another;
the transceiver unit transmits the multiple ramp sets, wherein the multiple ramp sets differ from one another in at least one of the ramp period and the time difference between consecutive frequency ramps;
the difference in the at least one of ramp period and the time difference between consecutive frequency ramps of the multiple ramp sets is dynamically adapted according to a speed of the motor vehicle; and
the sampling device varies the sampling frequency for each ramp set.

16. The radar sensor of claim 15, wherein the multiple ramp sets are transmitted in succession.

17. A method for operating a radar sensor, comprising:
transmitting a sequence of modulated rapid-chirp radar signals;
receiving radar echoes of the transmitted modulated rapid-chirp radar signals which are reflected by an object; and
detecting the received radar echoes at a predefined sampling frequency;
wherein:
the transmitted modulated rapid-chirp radar signals include a plurality of ramp sets;
each of the plurality of ramp sets has a plurality of frequency ramps;
each frequency ramp of a ramp set has a ramp period and a frequency deviation, and, within each of the plurality of ramp sets, all of the frequency ramps of the ramp set have the same ramp period as one another and the same frequency deviation as one another;
two consecutive frequency ramps have a time difference, and within each of the plurality of ramp sets, the time differences between consecutive frequency ramps of the ramp set are the same as one another;
the plurality of ramp sets differ from one another in at least one of the ramp period and the time difference between consecutive frequency ramps;
the difference in the at least one of the ramp period and the time difference between consecutive frequency ramps of the plurality of ramp sets is dynamically adapted according to a speed of the motor vehicle; and
the predefined sampling frequency is varied for each ramp set.

18. The method of claim 17, wherein the ramp sets of the plurality of ramp sets are transmitted in succession.

* * * * *